2,928,721
Patented Mar. 15, 1960

2,928,721

METHOD FOR PRODUCING THORIUM TETRACHLORIDE

Edward A. Mason, Lexington, and Carolus M. Cobb, Lynn, Mass., assignors, by mesne assignments, to the United States of America as represented by the United States Atomic Energy Commission No Drawing. Application November 16, 1956
Serial No. 622,516

8 Claims. (Cl. 23—14.5)

This invention relates to a method for producing thorium tetrachloride from thorium concentrates.

Thoriferous concentrates such as result from the beneficiation of thoriferous ores have been chlorinated in the presence of substantial amounts of carbon by treatment with chlorine-containing gases; however, in order to obtain a practical rate of reaction, it has been necessary to utilize temperatures above about 700° C. and a preferred range of 800–1000° C. It has also been found that owing to the low heat of reaction of the chlorination of a mixture of carbon and thoriferous materials, it has been difficult to maintain the temperature of the reacting mass at 700° C. or higher without supplying additional heat by periodically burning off some of the carbon in the mass, by introducing super-heated gases, or by external and/or internal heat addition.

This invention provides a new method of converting such concentrates to thorium tetrachloride in a most efficacious, economic and efficient manner, wherein corrosion, frequent shut-downs, and loss of efficiency are avoided and continuous operation is made possible. Furthermore, the $ThCl_4$ produced in accordance with the invention is characterized by its purity which is very desirable in the subsequent production of thorium metal by processes well known, per se.

One of the objects of the present invention is to provide a form of thorium material which may be effectively chlorinated at comparative low temperatures to minimize corrosive attack on the materials of construction. Another object of the present invention is to provide a process for rapid rate of chlorination of thorium material at comparative low temperatures of reaction. Another object of this invention is to provide fluidized bed technique of producing $ThCl_4$ whereby the fusion of the formed $ThCl_4$ is prevented and plugging of said fluidized reactor is eliminated. These and other objects will become apparent from the following description of the invention.

The present invention is particularly adaptable to increasing the rate of chlorination of thoriferous oxidic concentrate compositions such as the oxides, nitrates, oxalates, etc., wherein said concentrates are first carburized at high temperatures with the amount of added carbon controlled so as to produce a chemical combination of said thorium constituent to thorium carbide.

While such oxidic concentrates have heretofore been chlorinated at comparatively low temperatures, the rate of chlorination under such conditions has been found to be inadequate and insufficient to sustain successful commercial operations. On the other hand, the reactivity of the thorium element in oxidic concentrates according to the present invention has been found to be sufficient to maintain commercially successful rates of fluidized bed chlorination.

In its broadest aspect this invention contemplates a process for producing thorium tetrachloride from thoriferous concentrates, by reacting the thoriferous material with a carbonaceous reducing agent in certain minimum proportion, at temperatures sufficient to cause the evolution of carbon monoxide, comminuting the reaction product, and reacting the comminuted product by a fluidized-solids technique with a gaseous chlorinating agent at comparative low temperatures. More particularly, thoriferous materials are mixed or treated with a carbonaceous reducing agent in excess of 0.05 part carbon per part of thoriferous material, such as coal, coke, charcoal, residual fuel oils, coal gas, natural gas, etc. and heated at temperatures over 1300° C. and preferably 2000°–2500° C. or higher. Temperatures below 1500° C. would also be effective when the solid carbonaceous material is compressed, or when gaseous reducing agents are employed. The resulting mass is cooled, comminuted and reacted with a gaseous chlorinating agent such as chlorine, phosgene, carbon tetrachloride, etc. with or without the presence of an inert gas, in a fluidized bed at a temperature above 185° C., and preferably between 300° and 500° C. Since thorium tetrachloride fuses at about 770° C. any temperatures of chlorination employed below that temperature will result in thorium tetrachloride remaining behind in the bed and further purification thereof could be effected in well known methods, per se. Furthermore, under these operating conditions the thorium tetrachloride is produced below its fusing point and no plugging of the fluidized bed occurs. At chlorination temperatures above 920° C. the thorium tetrachloride formed would separate from the reacting mass by volatilization of the same. Chlorinating temperatures below 770° C. and preferably below 500° C. are effective in our process and advantageous in preventing plugging of the fluidized bed and minimizing the corrosive action on materials of construction without affecting the rapid rate of chlorination.

By reacting the thoriferous material with a carbonaceous reducing agent in proper proportions, it has been found that an economically high subsequent chlorination rate may be obtained at comparatively low chlorination temperatures. The $ThCl_4$ produced in accordance with the invention is very effective and useful in the subsequent production of pure grades of Th metal by processes well known, per se.

In operation the reaction of the thoriferous material with the carbonaceous reducing agent is carried out at a temperature between 2000 and 2500° C. or higher. Suitable carbonaceous reducing agents are coal, graphite, coke, charcoal, petroleum oils, residual fuel oil, methane, ethane, and other hydrocarbon gases such as coal gas, mixtures of hydrocarbons, or even hydrogen, etc. The thoriferous materials are preferably ground or otherwise comminuted to pass 40 mesh sieve and are mixed with the carbonaceous reducing agent as a liquid, solid or gas, and then heated in an induction, arc, resistance, or other furnace at the temperature indicated above. In the event that a gaseous or volatile carbonaceous reducing agent is used, the comminuted thorium source material may be first preheated to the reaction temperature and the reducing material passed into the heated mass. The quantity of carbonaceous material employed is such that the carbon content of the reducing agent shall be in excess of 0.05 part by weight of the thorium source material and preferably not more than 0.4 part. It will be clear that the actual ratio of carbon to thoriferous material employed will vary depending on the composition of the thoriferous material but a necessary consideration of the present invention is that the proportion of carbon to the thoriferous material and the temperature of reaction be sufficient to chemically combine substantially all the thorium element of the thoriferous material to thorium carbide. These conditions are met in present day thoriferous materials by employing a carbon-thoriferous ratio in excess of 0.05 part carbon per part of thoriferous material, and employing a temperature of reaction in excess of 1300° C.

During the course of the reaction between the thorium source material and the reducing agent, considerable quantities of carbon monoxide will be evolved and the commencement and termination of the reaction may be followed by the initiation or cessation of this evolution.

The resulting mass, containing thorium carbides is cooled under inert gas such as argon, helium, etc., and then comminuted by well-known means, per se, and pulverized to the required particle size suitable for the design of the subsequent fluidized bed chlorination operation. Preferable particle sizes are in the range of 40–300 mesh to provide ease of operation.

The comminuted and sized carbon-combined material is then continuously inducted into the fluidized-solids reactor where it is suspended or fluidized in an upwardly-moving gaseous stream containing a chlorinating agent such as chlorine, phosgene, carbon tetrachloride, and the like with or without an inert diluent gas. The reaction of the chlorinating agent with the thorium material is highly exothermic and in order to maintain the temperature of the reacting mass below 770° C., thereby obtaining the desirable features of the present invention, it is necessary to provide means for introducing or removing heat depending on the size of the reaction vessel and on the rates of introduction of the chlorinating agent and the thorium material. It is obvious that the thorium material may be maintained in a fluidized state and the rate of reaction controlled by regulating the concentration and/or the flow rate of the chlorinating agent in the gaseous suspending stream employing inert gases such as nitrogen, flue gas, etc. as diluents. The reaction of the chlorinating agent with the thorium material proceeds rapidly at temperatures below 770° C. producing thorium tetrachloride and some free carbon. At the temperatures of the reaction the thorium tetrachloride remains in the reaction vessel. In the event that a diluent inert gas is used, this gas may be recovered and returned to the preheater with little or no purification.

Methods which have been used for carrying out the process of this invention are described in the following examples.

PRODUCTION OF THORIUM CARBIDES

One liter concentrate of 1.8 molar solution of thorium nitrate was heated to 350° C. to remove water and denitrate the same. The resulting mass was cooled and then mixed with 95 grams of carbon black. This represents a ratio of 0.23 carbon to thorium. This mixture was charged into a graphite crucible and heated by induction heating to 2000° C. for 2 hours at atmospheric pressure. The mass was allowed to cool under the inert gas argon and then crushed under an inert gas of nitrogen to a size passing through a 40 mesh screen in preparation for chlorination using fluidized bed techniques as noted in the following examples:

*Example 1*

Approximately 150 grams of the prepared thorium carbide which analyzed 90% Th were suspended in an upwardly-moving gas stream in a Vycor glass reactor which was heated externally by means of electric windings. The gas stream consisted initially of nitrogen which had been pre-heated to about 300° C. Chlorine gas flow was initiated when the temperature of the fluidized solids reached 300° C., and the $N_2$ flow was decreased so that the gas entering the bottom of the reactor consisted of a pre-heated mixture of 3 parts per minute of chlorine and 6 parts per minute of $N_2$. The temperature in the reaction zone was maintained at 300° C. The purpose of the $N_2$ diluent was to provide temperature control, but it should be understood that chlorine gas alone could be used providing other methods of temperature control are provided. Nitrogen gas with small amounts of unreacted chlorine passed out of the reaction zone and solid thorium tetrachloride and some free carbon (about 6.5%) remained at the bottom of the reaction zone. After 25 minutes of operation 182 grams of thorium tetrachloride with 10 grams of free carbon formed. This represents a production rate of 7.3 parts per minute of thorium tetrachloride with no fusion or agglutination occurring in the fluidized reactor. Th was recovered by sublimating the same at about 700° C. under a vacuum of about 29.8 inches.

*Example 2*

A second test run was made in accordance with the procedure of Example 1 wherein the temperature of the fluidized chlorination reaction was maintained at 400° C., and the chlorinating gas employed was 4.3 parts per minute of chlorine mixed with 6 parts per minute of nitrogen. After operating for a period of 15 minutes 163 grams of thorium tetrachloride was obtained with 11 grams of free carbon. This represents a production rate of about 11 parts thorium tetrachloride per minute.

In order to show the effect of operating the fluidized bed chlorination of unreacted carbon-thorium concentrate mixture, a liter of 1.8 molar solution of thorium nitrate was heated to 350° C. to remove water and denitrate the same. The resulting mass was cooled to room temperature and mixed with 95 grams of carbon black and then ground to pass through a 50 mesh standard screen. 200 grams of the mixed mass which contained about 70 percent thorium was suspended in substantially pure chlorine gas at a rate of 16 parts chlorine per minute at a fluidized temperature of 300° C. Unreacted chlorine plus carbon monoxide and carbon dioxide passed out of the reaction zone and after an operation period of 80 minutes a solid mixture of thorium oxide, carbon, and thorium tetrachloride remained in the reactor. Chemical analysis of this residue showed a production of 55 grams thorium tetrachloride which represents a production rate of 0.7 part thorium tetrachloride per minute.

It will be apparent from the above that the rate of fluidized-bed chlorination of carbon reacted thorium concentrate of the present invention employing a diluted chlorine gas far exceeded the fluidized-bed chlorination of unreacted mixture of carbon-thorium concentrate at comparative low temperature chlorinations even when a substantially pure chlorine gas reaction was employed.

While this invention has been described and illustrated by the examples shown, it is not intended to be strictly limited thereto and other modifications and variations may be employed within the scope of the following claims.

We claim:

1. A process for chlorinating thorium comprising the steps of reacting thorium concentrate with a carbonaceous reducing agent in excess of 0.05 part by weight per part of thoriferous concentrate at a temperature in excess of 1300° C., cooling and comminuting the mass, chlorinating the resulting comminuted mass by suspending the same in a gaseous chlorinating agent in a fluidized reactor at a temperature maintained in between about 185° C. and 770° C., removing the resulting solid $ThCl_4$ from the reaction zone.

2. The process of claim 1 wherein the reducing agent is carbon black.

3. The process of claim 1 wherein the temperature in the chlorination reaction zone is maintained between 300 and 500° C.

4. The process of claim 1 wherein the chlorinating agent is chlorine gas.

5. The process of claim 1 wherein the chlorinating agent is a mixture of $Cl_2$ and an inert gaseous diluent.

6. The process of claim 5 wherein the gaseous diluent is $N_2$.

7. A process for chlorinating thoriferous concentrate, comprising the steps of heating the concentrate with a carbonaceous reducing agent to a temperature of about 1300° to about 2500° C., the carbon in said reducing agent being present to the extent of about 0.05 to about 0.4 part by weight per part thoriferous concentrate, cooling and comminuting the resulting mass, chlorinating the comminuted mass by suspending the same in a gaseous chlorinating agent in a reaction zone maintained at temperatures below 770° C. and removing the resulting solid thorium tetrachloride from reaction zone.

8. A continuous process for chlorinating the thorium values of thoriferous concentrate which comprises mixing said concentrate with a carbonaceous reducing agent to the extent of about 0.05 to about 0.4 part by weight per part of thoriferous concentrate, heating the mass to a temperature above about 1300° to about 2500° C., cooling and grinding, introducing the resulting solids into a stream of a chlorinating agent flowing upwardly in a reaction chamber maintained at a temperature between about 300°–500° C. at a fluidizing velocity to support the solids in said gas, and removing the resulting solid $ThCl_4$ from the reaction zone.

References Cited in the file of this patent
UNITED STATES PATENTS

| | | |
|---|---|---|
| 1,434,485 | D'Adrian | Nov. 7, 1922 |
| 1,646,734 | Marden | Oct. 25, 1927 |
| 2,446,221 | Ferguson | Aug. 3, 1948 |
| 2,448,479 | Wilhelm et al. | Aug. 31, 1948 |

OTHER REFERENCES

MDDC–1729, page 1, December 1947, Technical Information Div., Oak Ridge, Tenn.

Sidgwick: "Chemical Elements and Their Compounds," Oxford University Press, London, vol. 1, 1950, pages 632, 633.

AECD–3072, page 34, June 5, 1950, Technical Information Service, Oak Ridge, Tenn.

Seaborg et al.: "The Actinide Elements," pages 83, 88 (1954).